United States Patent [19]

Klimowicz

[11] Patent Number: 4,484,849
[45] Date of Patent: * Nov. 27, 1984

[54] MULTIPLE PIECE BOLT-TYPE FASTENER

[76] Inventor: Jerome R. Klimowicz, 3827 W. LeGrande Blvd., 103N, Mequon, Wis. 53092

[*] Notice: The portion of the term of this patent subsequent to May 12, 1998 has been disclaimed.

[21] Appl. No.: 232,692

[22] Filed: Feb. 9, 1981

Related U.S. Application Data

[63] Continuation-in-part of Ser. No. 218,366, Dec. 19, 1980, Pat. No. 4,416,574, which is a continuation-in-part of Ser. No. 47,268, Jun. 11, 1979, Pat. No. 4,266,460.

[51] Int. Cl.³ .................. F16B 23/00; F16B 35/00
[52] U.S. Cl. .................. 411/397; 411/200; 411/315; 411/479; 10/27 R
[58] Field of Search .............. 411/396, 397, 383, 378, 411/200, 209, 210, 211, 294, 295, 429, 427; 10/27 R

[56] References Cited

U.S. PATENT DOCUMENTS

| | | | |
|---|---|---|---|
| 291,039 | 1/1884 | Edgell | 411/209 |
| 388,007 | 8/1888 | Whitney | 411/397 |
| 840,249 | 1/1907 | Patton | 411/320 |
| 1,204,695 | 11/1916 | Scharmann | 411/294 |
| 2,810,139 | 10/1957 | Plagemann | 411/397 X |
| 3,468,211 | 9/1969 | Suan | 411/397 |
| 4,266,460 | 5/1981 | Klimowicz | 411/397 |

FOREIGN PATENT DOCUMENTS

| | | | |
|---|---|---|---|
| 756524 | 9/1933 | France | 411/397 |
| 170803 | 11/1921 | United Kingdom | 411/396 |
| 388263 | 2/1933 | United Kingdom | 411/396 |
| 524932 | 11/1976 | U.S.S.R. | 411/396 |

*Primary Examiner*—Thomas J. Holko
*Assistant Examiner*—Neill Wilson
*Attorney, Agent, or Firm*—Andrus, Sceales, Starke & Sawall

[57] ABSTRACT

A bolt is fabricated from an elongated threaded rod by severing the rod along a planar surface angularly oriented with respect to a longitudinal axial plane through the rod. A cup-shaped nut has three equicircumferentially spaced lateral locking openings in the side walls adjacent the outer base wall thereof. The cup-shaped nut has an axial length greater than twice the diameter of the opening, with the opening in the half of the nut including the base wall. The nut is threaded onto the severed end of the rod with the base wall abutting the end of the rod. At least one locking opening is exposed to the inclined planar surface, and a pin is forced into the exposed opening with the inner end of the pin terminating within the nut and located immediately adjacent to the inclined surface thereby affecting a positive interconnection of the nut to the rod. In one embodiment the pin is a solid pin formed of a softer metal than the rod. The opening in the nut is located adjacent the lower portion of the inclined plane. The nut is driven into abutting and complementary engagement with the inclined plane.

7 Claims, 6 Drawing Figures

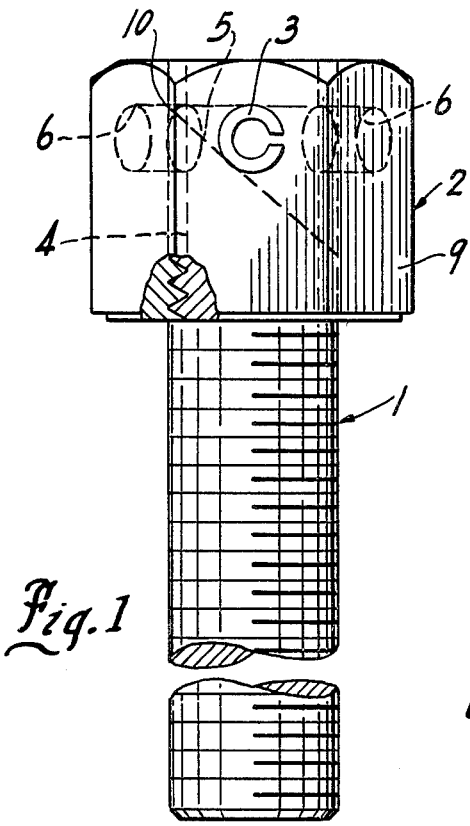
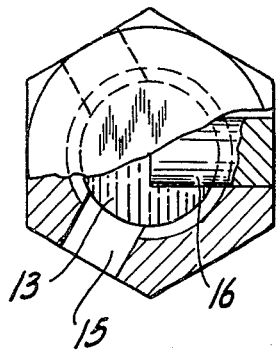
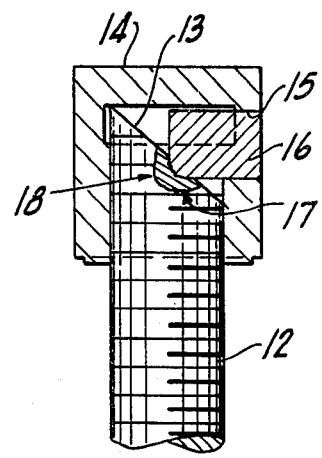
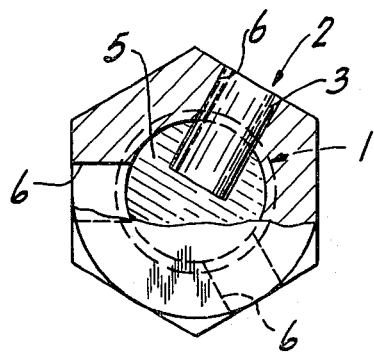
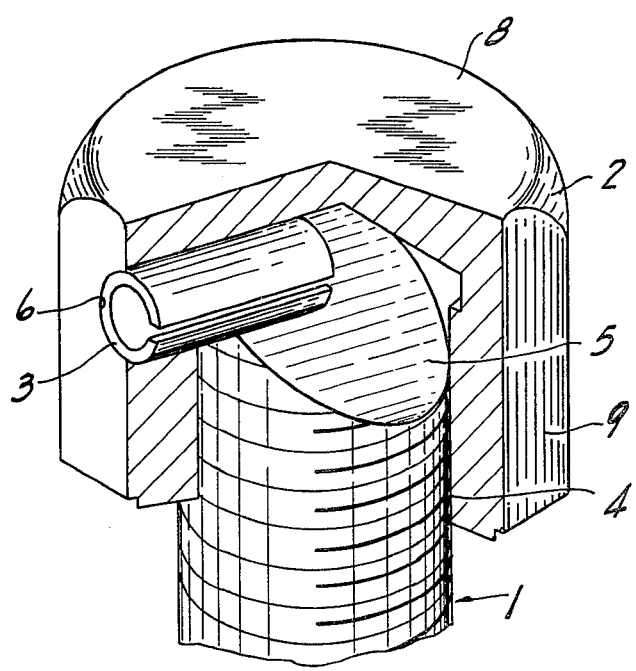
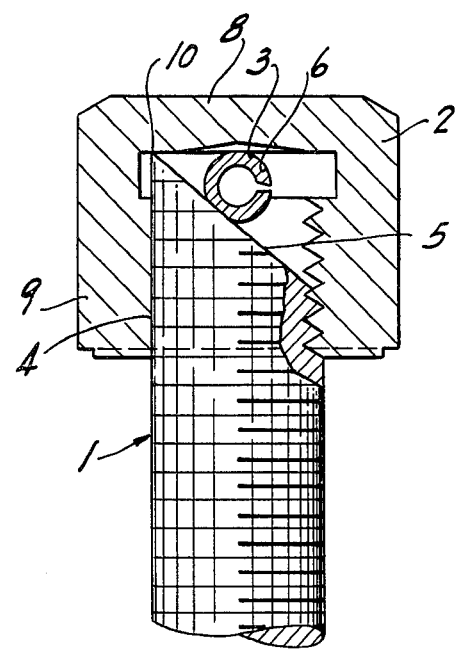

MULTIPLE PIECE BOLT-TYPE FASTENER

BACKGROUND OF THE INVENTION

This application is a continuation-in-part of my application entitled "Multiple Piece Bolt-Type Fastener" filed on Dec. 19, 1980, with Ser. No. 06/218,366, now U.S. Pat. No. 4,416,574 which issued Nov. 22, 1983, which is a continuation-in-part of an application filed on June 11, 1979 with Ser. No. 06/047,268 now U.S. Pat. No. 4,266,460 which issued May, 12, 1981.

This invention relates to a multiple bolt-type fastener and to the method of fabrication of such a fastener.

Bolt-type fasteners having a threaded shank and an integral head are widely used for interconnection and fastening of elements to each other. A twist or turning force is, of course, applied to the head for insertion and removal of the fastener. Fastening bolts are manufactured in many different lengths, but generally only the shorter length bolts are immediately available. Although certain suppliers may stock various long sizes of particular bolts, longer bolts are not generally and conveniently available on demand, particularly for the small user such as the retail purchaser.

The prior art includes suggestions for forming a bolt-type fastener from an elongated threaded rod, which is generally available in lengths substantially greater than three inches, as more fully discussed in the above copending application of the present inventor. As more fully disclosed therein, a bolt may be advantageously formed by cutting a threaded rod member to a desired length, with the cut end formed as a plane surface which is angularly oriented with respect to a longitudinal axial plane. A cup-shaped nut having aligned and opposed openings in the opposite side walls adjacent the outer base thereof is threaded onto the severed end of the rod. The nut may be positioned with the openings extending across the inclined surface adjacent the outer end of the rod. A locking pin is forced into at least one of the openings to firmly and fixedly interconnect the pin in place. The pin is located within the head immediately adjacent to the inclined surface of the rod thereby affecting a positive interconnection of the head to the rod and completing the fastener bolt.

SUMMARY OF THE PRESENT INVENTION

The present invention is particularly directed to an improvedment in the multiple piece bolt-type fastener having a rod or shank with the formed offset end and a threaded drive head pinned through a lateral opening to such end, and particularly to a specially formed drive head to form a high strength assembly with the base wall abutting the end of the rod. In accordance with the present invention a cup-shaped nut or drive head includes at least three circumferentially spaced locking openings in the side wall of the drive head and located in a radial plane adjacent the outer base wall thereof. The head is formed of a constant thickness body for an axial length which is substantially longer than that of the locking opening, such that the drive head body extends from the openings onto the rod. In one preferred embodiment, three equicircumferentially spaced openings are provided such that with the head fully threaded onto the severed end of the rod or shank and with the base wall abutting the end of the rod, one of the locking openings opens into the chamber between the inclined end of the shank and the cup-shaped head. A pin is forced into the exposed opening engaging the inclined surface of the rod, thereby affecting a positive interconnection of the head to the rod and completing the fastener bolt. The combination of the enlarged head and at least three locking openings establishes a high strength connection of the head to the shank in a simple, economical and practical construction. In an optimum construction, the openings in the nut are aligned with the inner axial end of the inclined plane surface. The pin is formed as a solid member of a slightly softer metal than the rod, and generally with a flat end. The pin is driven into deforming abutting engagement with the rod such that in the final locking position, the end of the pin essentially is in complimentary abutting engagement with the inclined end of the rod.

DESCRIPTION OF THE DRAWING FIGURES

The drawing furnished herewith generally illustrates the best mode presently contemplated for the invention and is described hereinafter.

In the drawing:

FIG. 1 is an elevational view of a bolt constructed in accordance with the present invention;

FIG. 2 is a pictorial view of the bolt shown in FIG. 1 with parts broken away and sectioned to show detail of construction.

FIG. 3 is a top view of the bolt with parts broken away and sectioned;

FIG. 4 is a side elevational view of the fabricated bolt shown in FIG. 1, with parts broken away and sectioned;

FIG. 5 is a view similar to FIG. 4 illustrating another embodiment; and

FIG. 6 is an enlarged top view of FIG. 5, with parts broken away and sectioned.

DESCRIPTION OF THE ILLUSTRATED EMBODIMENT

Referring to the drawings and particularly to FIG. 1, a bolt unit is illustrated including a shank 1 to which an outer cup-shaped drive head or nut 2 is firmly interconnected by a laterally extending pin 3, generally as shown in the inventor's above identified application. As most clearly shown in FIGS. 2 and 3, shank 1 is threaded into the nut 2 as at 4. The innermost end of the shank 1 is provided with an inclined end face or surface 5 within nut 2 and a pin 3 extends into the side of nut 2 and terminates within the nut 2 across the inclined surface. The nut 2 is, however, uniquely formed with an extended body portion 9 which extends onto the shank 1 substantially beyond the pin 3. Further, nut 2 is formed with at least three locking openings 6, and which are equicircumferentially spaced. Each opening 6 is adapted to receive the locking pin 3. Applying a turning force to the nut 2 in one direction causes the nut 2 to tighten onto the shank 1 thereby providing a firm interconnection therebetween. Rotation forces applied in an opposite or loosening direction to the nut 2 is transmitted by the locking pin 3 into engagement with the inclined surface 5 of the rod and thereby transmits the forces in the same manner as if the head were rigidly or integrally interconnected and fixed to the rod.

More particularly, in the fabrication of a bolt unit as shown in FIG. 1, the shank 1 is formed from a suitable and correspondingly threaded rod of indefinite length. The rod may be any standard threaded rod such as available in a hardware store, a distributor of industrial products and the like. Relatively long threaded rods are readily available of a conventional material, and may be available or formed of special materials. After the separate formation of the rod and the nut, the bolt length is determined. The threaded rod is cut along an inclined plane, thereby forming and defining the end clamp surface 5.

The nut 2 is illustrated as a cup-shaped member having a closed outer end or base wall 8 which may be continuous, formed with a central socket or the like and an internally threaded annular body or side wall 9 of a substantially constant thickness throughout the complete length of the nut. The internal threads of the nut 2 correspond to the external threads of rod. The nut 2 is formed with an undercut portion adjacent the base wall 8, as most clearly shown in FIG. 4, to permit a full threaded engagement of the shank with the nut, and the bottom of the shank on the base. In accordance with the present invention, the cup-shaped member 2 is formed with the tubular body 9 having an axial length substantially greater than the axial length of the openings and of a substantially constant thickness, as most clearly shown in FIG. 4. The pin receiving locking openings 6 are equicircumferentially spaced within the side wall 9 immediately inwardly of the base wall 8 and thus in the outer portion of the nut body 9 adjacent the base wall. The length of the nut 2 and particularly body 9 thus is at least twice the axial length of the clamping opening 6 and associated pin 3, and thus extends substantially onto the shank 1 beyond the locking openings 6 and the inclined end 5. The openings 6 may be readily formed in the fabrication of nut 2, or subsequently, formed in an existing head such as by use of a conventional drill.

The nut 2, as rod 1, may be formed of a conventional nut and bolt steel with the enlarged nut body maintaining a strength provided by the conventional bolt. After appropriately cutting of the rod and providing of an appropriate nut 2, the nut 2 is threaded onto the rod 1 until the base wall 8 abutts the end 5 of rod 2, as at 10. The three openings 6 extending across and immediately adjacent the removed end portion of the rod 1 ensures that at least one opening 6 is exposed to the chamber formed between the rod end 5 and the base of the opening of the nut 2. The pin 3, which is preferably a conventional split roll-pin, may therefore be and is inserted into the exposed opening using any suitable tool such as a hammer, a pressure forcing clamp or the like with the rod 1 abutting the nut 2. The pin 3 need only be inserted approximately $\frac{1}{3}$ to $\frac{1}{2}$ of the maximum length into the head or nut 2.

The pin 3 may also be provided with a slight taper to accommodate ease of assembly. The pin 3 moves through opening 6 and is aligned over the inclined end 5 of rod. The pin 3 preferably is formed to establish a firm press fit to maintain the desired fixed interconnection, while providing a simple and inexpensive method of assembly.

Although shown with a single pin, the multiplicity of circumferentially spaced openings provides the availability of using a second pin in the second exposed opening, such as shown in FIG. 3. A second pin may be desirable to even more positively lock the head to the shank.

As a result of the enlarged nut structure and the multiple and equicircumferentially spaced locking openings, the nut may be formed of conventional bolt and nut steel and maintain the pulling or tensile strength and the turning strength of the usual integral bolt. The turning forces, in both directions on the head 2 of the finished bolt is thus transferred to the shank 1 in accordance with conventional practice.

Depending upon the orientation of the head and rod, the head may turn slightly relative to the rod in the release or turn-off direction of the unit. Although a high strength bolted connection is provided, the release strength may not equal the applied strength. Thus, if the bolt should rust or lock in place, the head may shear off the bolt releases upon application of a release force. The invention has discovered that a high strength release, as well as applying, head results with a modified structure, one embodiment of which is shown in FIGS. 5 and 6.

More particularly, in the fabrication of a bolt unit, as shown in FIGS. 5 and 6, a shank 12 is formed from a suitable and correspondingly threaded rod of indefinite length. The rod may be of any standard threaded rod such as available in a hardware store, a distributor of industrial products and the like. The threaded rod is cut along an inclined plane, thereby forming and defining the end clamp surface 13. In a practical construction the inclined plane defined an angle of 39 degrees. In FIGS. 5 and 6 a cup-shaped nut is again provided having internal threads corresponding to the external threads of rod. The nut 14 is generally similar to the construction of that of the previous embodiment to permit a full threaded engagement of the shank with the nut, and the bottoming of the shank on the base. In accordance with the embodiment of FIGS. 5 and 6, pin receiving locking openings 15 of any suitable or desired number are equicircumferentially spaced within the side wall to receive a locking pin 16. The openings 15 are located, however, within the base wall to locate the openings substantially aligned with the axially inner portion 17 of the inclined plane. The length of the nut 14 and particularly body portion is preferably at least twice the axial length of the clamping opening 15 and associated pin 16.

In the present embodiment, the diameter of the pin and pin opening are enlarged as well as being located further onto the inclined plane surface 13. In a practical construction, the pin and pin opening had a diameter equal to one half the thread diameter.

Further, the inner rod abutting end of the pin 16 is shown with an inclined end 18 complementing the inclined clamping surface of the shank 12. The combination of the inward location of the pin on the shank and the complementing surfaces has been found to significantly increase the turn-off or release strength of the unit. This latter embodiment also results in a firm initial attachment of the head, presenting a reliable and finished bolt assembly.

In the method of forming the unit, the pin 16 is formed as a solid member and may be of a metal slightly softer than the shank 12. The pin 16 is formed with a flat end and is driven into abutting engagement with clamping surface 13, with inner end deforming into the complementing abutting surface 18. In a practical embodiment, the pin was formed of a readily available metal having a hardness in the range of 20 to 25 Rockwell C and applied to a rod having a hardness of the same general order. The pin diameter was equal to one-half the thread diameter of the rod, and was manually driven in place using a hammer. The inventor found that the resulting structure has a turn-off or release torque of up to substantially 90% of the load or applying torque.

This latter embodiment thus provides a bolt assembly which is conveniently and inexpensively formed while producing an improved turn-on and turn-off characteristic.

Various modes of carrying out the invention are contemplated as being within the scope of the following claims particularly pointing out and distinctly claiming the subject matter which is regarded as the invention.

I claim:

1. A bolt-type fastening unit, comprising a threaded shank having an inclined end surface extended completely across said shank, a drive nut having a base wall and a threaded axial opening from the base to substantially the entrance to said axial opening, said nut being threaded onto said shank with said base wall adjacent the outermost end of said shank, said nut having equicircumferentially spaced side wall openings located in alignment with the axially inner portion of said inclined end surface and spaced from the axially outermost entrance end, at least one of said openings extending across and inwardly toward said end surface with said base wall of said nut adjacent said shank, and an interlocking pin fixedly extending through one of said exposed openings and terminating within the nut with the inner end in abutting engagement with said end surface, said inner pin end having an end complementing said inclined end surface.

2. The bolt-type fastening unit of claim 1 wherein said end surface is a planar surface extended across the shank, and said pin is a metal member having a deformed inner end driven into abutting engagement with said planar surface.

3. The fastening unit of claim 2 wherein said openings and said interlocking pin are located in alignment with the axially inner end of said inclined end surface.

4. The fastening unit of claim 3 wherein said openings and said pin have a diameter substantially equal to one-half of the thread diameter of said shank.

5. The fastener unit of claim 3 wherein said head has a substantially constant wall thickness throughout the axial length.

6. The method of forming a bolt-type fastening unit, comprising forming a threaded shank with an inclined end planar surface, threading a cup-shaped drive onto said shank and establishing a chamber between the head and the end of the shank, providing said head with at least one opening through the side wall spaced from the entrance to said cup-shaped drive head, and driving an interlocking pin through said opening into abutting engagement with said planar end surface, and including the deforming of said pin end by said driving to complement said inclined planar end surface and thereby interlocking the head to the shank and transmit all turning forces applied to the head to the shank.

7. The method of claim 6 including driving said pin with the inner end slightly deforming said inclined planar end surface.

* * * * *